(12) United States Patent
Nakahara et al.

(10) Patent No.: US 6,950,170 B2
(45) Date of Patent: Sep. 27, 2005

(54) ELECTRO-OPTICAL PANEL, ELECTRONIC APPLIANCE AND PRODUCTION METHOD OF THE ELECTRO-OPTICAL PANEL

(75) Inventors: Hiroki Nakahara, Shiojiri (JP); Takatomo Toda, Matsumoto (JP); Kotaro Ueno, Misato mura (JP)

(73) Assignee: Seiko Epson Corporation (JP)

( * ) Notice: Subject to any disclaimer, the term of this patent is extended or adjusted under 35 U.S.C. 154(b) by 7 days.

(21) Appl. No.: 10/413,444

(22) Filed: Apr. 14, 2003

(65) Prior Publication Data

US 2004/0004691 A1 Jan. 8, 2004

(30) Foreign Application Priority Data

Apr. 18, 2002 (JP) ........................................ 2002-116691

(51) Int. Cl.[7] ............................................ G02F 1/1333
(52) U.S. Cl. ....................................................... 349/158
(58) Field of Search ........................................ 349/158

(56) References Cited

U.S. PATENT DOCUMENTS 5,766,493 A 6/1998 Shin
6,229,585 B1 * 5/2001 Yanagi ........................... 349/65
6,602,743 B2 * 8/2003 Wong ............................ 438/151
6,737,289 B2 * 5/2004 Woo et al. ..................... 438/30

FOREIGN PATENT DOCUMENTS

| JP | 04-116619 | 4/1992 |
| JP | 05-249422 | 9/1993 |
| KR | 1997-0009480 | 2/1997 |

OTHER PUBLICATIONS

Communication from Korean Patent Office regarding counterpart application.

* cited by examiner

Primary Examiner—Tarifur R. Chowdhury
Assistant Examiner—Richard H Kim
(74) Attorney, Agent, or Firm—Harness, Dickey & Pierce, P.L.C.

(57) ABSTRACT

An electro-optical panel having improved cracking resistance includes a substrate having scratches and cracks formed during a production process removed by etching.

5 Claims, 10 Drawing Sheets

ELECTRO-OPTICAL PANEL, ELECTRONIC APPLIANCE AND PRODUCTION METHOD OF THE ELECTRO-OPTICAL PANEL

BACKGROUND OF THE INVENTION

1. Field of the Invention

This invention relates to an electro-optical panel such as a liquid crystal panel. More particularly, this invention relates to an electro-optical panel having improved crack resistance by removing scratches and cracks existing on the outer surfaces of glass substrates constituting the electro-optical panel. The invention further relates to a production method of such an electro-optical panel.

2. Related Art

An electro-optical panel such as a liquid crystal panel is fabricated by sandwiching an electro-optical material between two light-transmitting substrates. The light-transmitting substrates are usually glass substrates, and the liquid crystal panel per se has a structure fabricated by bonding two glass substrates to each other.

The liquid crystal panel described above has a problem in that the liquid crystal panel is broken by impact due to scratches and cracks that develop in the glass substrate during a production process.

Such scratches and cracks develop in a production process of the liquid crystal panel including a production step of the glass substrates for the liquid crystal panel, a cutting step of the liquid crystal panel and a conveying step of the glass substrates for the liquid crystal panel. In the production process of the liquid crystal panel, two glass substrates (also called "large sheet glass substrate" and "mother glass substrate", and hereinafter called "large sheet glass substrate") are bonded to each other to produce a substrate having a plurality of liquid crystal panels (hereinafter called "large sheet panel substrate"), and each large sheet panel substrate is cut to yield discrete liquid crystal panels. The cutting step of the large sheet glass substrate employs a method that forms cutting lines on a surface of each large sheet glass substrate by use of a cutter, or the like, and applies force along the cutting lines by use of a jig to push and cut the large sheet glass substrate, and a method that irradiates a laser beam along the cutting lines to cut the large sheet glass substrate. In either case, scratches and cracks unavoidably develop on the cut surface of the cut glass substrate (corresponding to the side surface of the liquid crystal panel) and at the corners of the cut surface.

In each process step other than the cutting step described above, scratches and cracks may develop on the glass substrate constituting the liquid crystal panel in many manufacturing steps such as when a robot clamps and conveys the liquid crystal panel and when the liquid crystal panel is fixed to, and moved on, a bench.

Such scratches and cracks develop depending on factors such as the stress applied to the liquid crystal panel, and the dropping of a cellular telephone as a product, for example, results in cracks of the liquid crystal panel.

In view of the problems described above, the invention aims at providing an electro-optical panel having improved crack resistance of a substrate by removing scratches and cracks developed in the substrate during a production process, and a production method thereof.

SUMMARY

According to one aspect of the invention, there is provided an electro-optical panel including two glass substrates bonded so as to face each other, wherein each of the glass substrates has a mutually facing surface (an inboard surface) and at least one surface not facing the other substrate, and the surface not facing the other substrate is subjected to an etching treatment.

This electro-optical panel has a construction in which an electro-optical material such as a liquid crystal is sandwiched between two glass substrates, and each of the two glass substrates has a mutually facing surface and a surface not facing the other substrate. An etching treatment is applied to the surface not facing the other substrate. This etching treatment removes scratches and cracks developed on the glass substrates during a production process such as bonding and cutting of the glass substrates. Since scratches and cracks formed on the glass substrates may result in breakage of the glass substrates, the etching treatment can improve crack resistance of the electro-optical panel by removing the scratches and cracks.

According to an embodiment of the electro-optical panel described above, one of the glass substrates has an extended portion extending beyond an edge of the other glass substrate, a semiconductor device and wires of conductors are arranged in a region of the mutually facing surface on the extended portion, and regions other than the region in which the semiconductor device and the electric wires are arranged are subjected to an etching treatment. The region of the extended portion on which are arranged semiconductor devices such as driver ICs for driving the liquid crystal and wires of conductors cannot be etched. However scratches and cracks may develop in other regions on the extended portion. Therefore, the crack resistance of the glass substrate can be improved by removing such scratches and cracks.

According to another embodiment of the electro-optical panel, the surface not facing the other substrate includes an opposite surface (an outboard surface) on the opposite side of the substrate as the mutually facing surface, and side surfaces extending between the opposite surface and the mutually facing surface, each of the glass substrates has a ridgeline at a line of intersection between the opposite surface and the side surfaces, and the ridgeline is subjected to etching treatment. In this embodiment, part of the mutually facing surface of each glass substrate, the opposite surface on the opposite side of each glass substrate and the side surfaces are all etched. Etching is also carried out along the ridgeline at the intersection between the opposite surface and the side surface. The ridgeline is the corner of the glass substrate, and scratches and cracks developed at the ridgeline are particularly likely to result in crack of the glass substrate. Therefore, when scratches and cracks at such a portion are etched away, cracking of the glass substrate can be effectively prevented.

According to still another embodiment, the electro-optical panel is produced when a large sheet panel is cut, and the surface not facing the other substrate described above includes the cut surface of the electro-optical panel. Discrete electro-optical panels are generally acquired when the large sheet panel substrate having a plurality of electro-optical panels is cut, and scratches and cracks are likely to develop in the resulting electro-optical panels due to the cutting step. Therefore, when the cutting surface, on which such scratches and cracks frequently develop, is etched, scratches and cracks that would otherwise result in cracking of glass can be effectively removed.

The electro-optical panel can be used for a display unit of a cellular telephone, a mobile electronic terminal and other electronic appliances.

According to another aspect of the invention, there is provided a method of producing an electro-optical panel having two glass substrates bonded so as to face each other, each of the glass substrates having a mutually facing surface (an inboard surface) and another surface not facing the other substrate, the method comprising a mask formation step of forming a mask at least partially on the surface not facing the other substrate; an etching step of etching the surface not facing the other substrate after the mask is formed; and a mask removal step of removing the mask after the etching step is carried out.

According to the production method of the electro-optical panel described above, etching is carried out after the mask is formed at a part of the surface of the electro-optical panel not facing the other substrate, fabricated by bonding the two glass substrates to each other, and the mask is then removed. Scratches and cracks existing on the outer surface of the glass substrate at portions other than the masked portion can be thus removed.

According to an embodiment of the production method of the electro-optical panel described above, one of the glass substrates includes an extended portion extending beyond an edge of the other glass substrate, and the mask is formed so as to cover the region of the mutually facing surface positioned on the extended portion.

Consequently, etching treatment can be carried out for other portions in the state where the extended portion, at which the semiconductor device and the wires of conductors are arranged, is protected.

According to another embodiment of the production method of the electro-optical panel described above, one of the glass substrates has an extended portion extending beyond an edge of the other glass substrates, and a mask is formed inside a region of the mutually facing surface positioned on the extended portion, in which a semiconductor device and electric wires are arranged. Therefore, an etching treatment can be carried out for portions of the extended portion other than the portion in which the semiconductor device and the wires of conductors are arranged, and scratches and cracks can be removed.

The mask formation step may apply a resist to the extended portion. The application of the resist may use a so-called "ink jet method" that jets a droplet material from a nozzle. The ink jet method can partially apply the resist in accordance with a minute pattern corresponding to the region of the driver IC and to the region of the wires and can form the mask. The application of the resist may use a screen-printing method, a dispenser, a brush or a writing brush.

According to still another aspect of the invention, there is provided a method of producing an electro-optical panel having two glass substrates bonded so as to face each other, comprising a step of forming a large sheet panel substrate by bonding two large sheet glass substrates; a mask formation step of forming a mask on the side surfaces of the large sheet panel substrate; an etching step of etching the outer surfaces of the large sheet panel substrate after the mask is formed; a mask removal step of removing the mask after the etching step is carried out; and a step of producing a plurality of electro-optical panels by cutting the large sheet panel substrate.

In the production method of the electro-optical panel described above, the two large sheet glass substrates are bonded to each other to produce the large sheet panel substrate. After the mask is formed on the side surfaces, the outer surface of the large sheet glass substrate is etched. The mask is thereafter removed, and the large sheet panel is cut to acquire discrete liquid crystal panels. This production method can remove scratches and cracks formed on the surface of the large sheet glass substrates in the process steps up to the production step of the large sheet panel by conducting etching.

In the mask formation step, the mask may be formed of a material having chemical resistance to an etching solution used for etching. The etching solution used for the etching step may be hydrofluoric acid or a chemical solution of a hydrofluoric acid type. When the etching step is carried out in such a fashion as to etch the outer surface of the electro-optical panel by a depth of at least 10 $\mu$m, scratches and cracks that commonly develop can be effectively removed. The crack resistance of the electro-optical panel can be thus improved.

DETAILED DESCRIPTION

Preferred embodiments of the invention will be hereinafter explained with reference to the drawings.

Etching Treatment

The invention has a feature in that scratches, cracks, micro-cracks, etc, which develop in glass substrates during a production process of a liquid crystal panel (as an example of electro-optical panels), are removed by conducting an etching treatment in the production process, and the crack resistance of the glass substrates is improved. This etching treatment can be carried out (1) in the state of a large sheet panel substrate, (2) after the large sheet panel is primarily cut to form so-called "rectangular panels", (3) after secondary cutting is carried out to acquire discrete liquid crystal panels and (4) after an IC for driving a liquid crystal (hereinafter called "driver IC") is mounted to each liquid crystal panel. Treatment in each stage will be explained next in detail.

Figure 1:
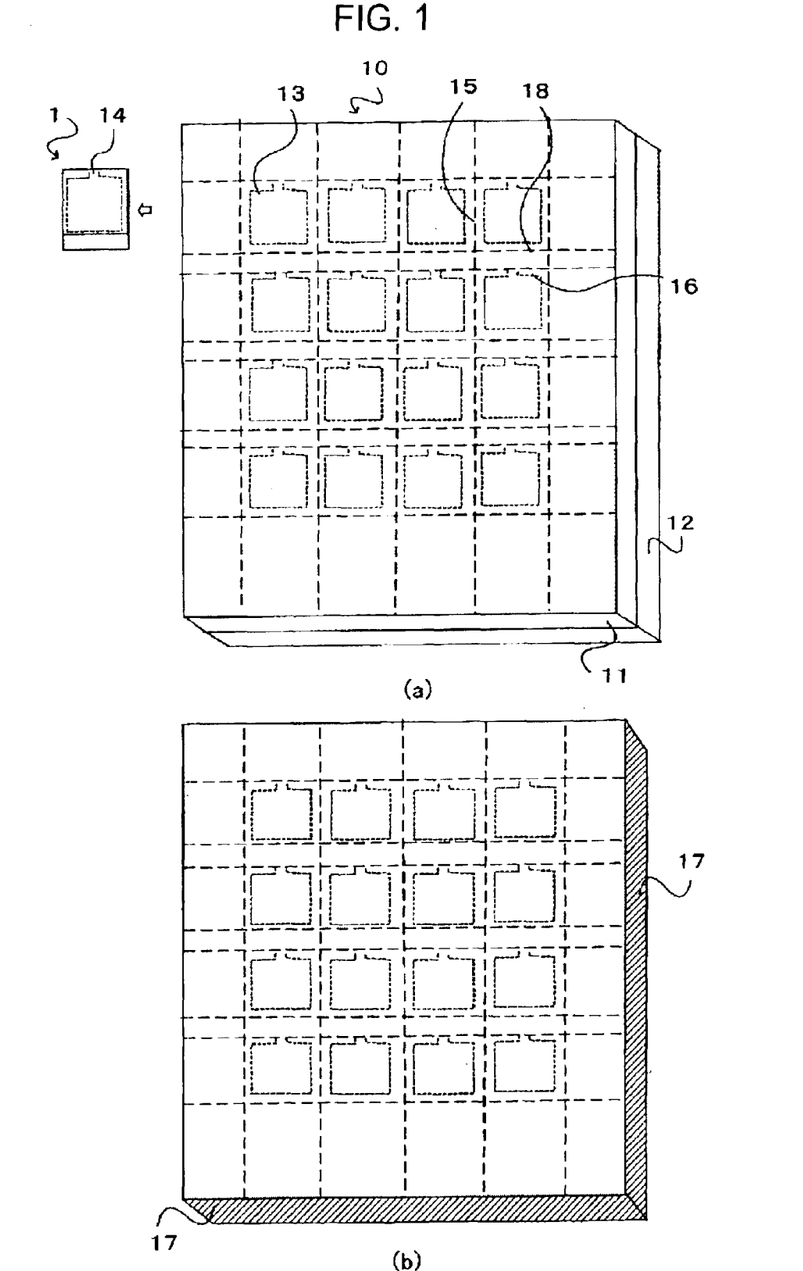
FIGS. 1a and 1b schematically show a structure of a large sheet panel substrate to which an etching treatment of the invention is applied.

In the State of a Large Sheet Panel Substrate:

Explanation will be given first of the etching treatment carried out in the state of the large sheet panel substrate (hereinafter called "etching treatment A"). FIG. 1A schematically shows a construction of the large sheet panel substrate. Referring to FIG. 1A, the large sheet panel substrate 10 is formed by bonding large sheet glass substrates 11 and 12 to each other while sandwiching spacers (not shown), and a sealant 13 therebetween. When such a large panel sheet substrate 10 is cut along cutting lines 15 and 16, discrete liquid crystal panels 1 can be acquired. In the example shown in FIG. 1A, the large sheet panel substrate 10 is first cut along the cutting line 16, at which each opening portion 14 of the sealant 13 is positioned, to yield the rectangular panels (hereinafter called "primary cutting"). In the rectangular substrate so obtained, the opening portions 14 of a plurality of liquid crystal panels are aligned along the major side of the rectangle. Therefore, after the liquid crystal is injected into the liquid crystal panel 1 through each opening portion 14 by vacuum injection or by other means, the opening portions 14 are sealed. Thereafter the rectangular substrate is further cut along the cutting line 15 (hereinafter called "secondary cutting") and discrete liquid crystal panels 1 can be acquired.

The invention carries out etching treatment for the upper and lower surfaces of the large sheet panel substrate 10 prior to the cutting step described above to remove scratches and cracks developed before the production of the large sheet panel substrate. More particularly, the four side surfaces of the large-sheet panel substrate 10 are masked with a masking material 17 at first, as shown in FIG. 1B. Because the opening portions 14 of a plurality of liquid crystal panels 1 contained in the large sheet panel substrate are still opened (not yet sealed) in this state, a chemical solution used for the etching treatment must be prevented from flowing into the cell of the liquid crystal panel 1. When the upper and lower surfaces of the large sheet panel substrate 10 are etched with the chemical solution described later, a portion of the glass having small scratches and cracks is dissolved away to remove them.

After Primary Cutting:

Next, an explanation will be given of the etching treatment carried out after the large sheet panel substrate is primarily cut and the rectangular panels (sub-large panels) are acquired (hereinafter called "etching treatment B"). FIGS. 2A and 2B show an example of the rectangular panels after primary cutting is made. FIG. 2A is a plan view of a rectangular panel 20 and FIG. 2B is its perspective view. As shown in FIGS. 2A and 2B, the rectangular panel 20 remains in a state where the large sheet panel substrate 10 shown in FIG. 1A is cut along the cutting line 16, the liquid crystal in injected into the cell gap of each liquid crystal panel 1, the opening portion 14 is sealed and the large sheet glass substrate 11 is further cut along the cutting line 18 to form a so-called "extended portion 21". After acquiring discrete liquid crystal panels by a secondary cutting, a driver IC for driving the liquid crystal panel 1 is mounted to the extended portion 21. Terminals for establishing electric connection with external main substrate and control substrate and bumps for establishing connection with the driver IC are also formed on this extended portion 21.

Scratches and cracks develop in the rectangular panel 20 during the cutting step of the large sheet panel substrate 10. These scratches and cracks develop in most cases along the cut surface. Therefore, the etching treatment is applied to the liquid crystal panel 1 as a whole to remove scratches and cracks.

In this instance, only the extended portion 21 is masked with a masking material 27 as shown in FIGS. 2A and 2B to prevent damage of the electric wiring such as the terminals and the bumps by etching because they are formed on the extended portion 21 as described above. The masking method will be described later. Etching is applied to all the surfaces other than the masked extended portion 21 to remove scratches and cracks. As a result, scratches and cracks mainly developed in the primary cutting step are removed and the crack resistance of both the upper and lower substrates 2 and 3 (See FIG. 3) that constitute the liquid crystal panel 1 can be greatly improved. The liquid crystal has already been injected into the cell gap of each liquid crystal panel 1 and the opening portion 14 has already been sealed in the state of the rectangular panel 20. Therefore, the chemical solution used for etching does not enter the cell, and it is not necessary to cover the side surfaces of the rectangular panel 20 with the sealant as in the case of the large-sheet panel substrate shown in FIG. 1.

After Cutting of the Liquid Crystal Panel:

Next, an explanation will be given of the etching treatment that is carried out after the large sheet panel substrate is cut and the discrete liquid crystal panels are removed (hereinafter called "etching treatment C"). FIG. 3A schematically shows the structure of the discrete liquid crystal panel after cutting. As shown in FIG. 3A, the liquid crystal panel 1 has a structure in which the upper and lower substrates 2 and 3 made of glass are bonded to each other. The upper substrate 2 is acquired by cutting the large sheet glass substrate 11 shown in FIG. 1A and the lower substrate 3 is acquired by cutting the large sheet glass substrate 12 shown in FIG. 1A.

As shown in FIG. 3A, the lower substrate 3 has a greater area than the upper substrate 2 and has the so-called "extended portion 4" that extends beyond the upper substrate 2. The extended portion 4 is formed by the steps of cutting the large sheet panel substrate 10 along the cutting lines 15 and 16 shown in FIG. 1A and cutting and removing only the portion of the large sheet substrate 11 along the cutting line 18. As described above, the driver IC for driving the liquid crystal panel 1 is mounted to the extended portion 4 in a subsequent step. The terminals for establishing electric connection with an external main substrate and control substrate and the bumps for establishing electric connection with a driver IC are also formed on the extended portion 4.

In this liquid crystal panel 1, scratches and cracks develop in the cutting step of the large sheet panel substrate 10. Particularly, because the side surfaces 2a and 3a of the upper and lower substrates 2 and 3 are the cut surfaces, a large number of scratches and cracks (denoted by reference numeral 5) may develop (These scratches and cracks 5 are shown with magnification for ease of explanation in FIG. 3A.)

The etching treatment is applied to the discrete liquid crystal panel 1 as a whole to remove scratches and cracks.

Since electric wiring such as the terminals and the bumps is formed on the extended portion 4 as described above, only the extended portion 4 is masked and protected with the masking material 7 as shown in FIG. 3B to prevent their damage by etching. The masking method will be described later. Etching of all the surfaces except the masked extended portion 4 is carried out to remove scratches and cracks. In this way, scratches and cracks developed mainly in the cutting step are removed, and the crack resistance of the upper and lower substrates 2 and 3 constituting the liquid crystal panel 1 can be greatly improved.

After Mounting of the Driver IC:

Next, an explanation will be given of the etching treatment that is carried out after mounting of the driver IC (hereinafter called "etching treatment D"). The etching treatment carried out after mounting of the driver IC is basically the same as the etching treatment of the discrete liquid crystal panel described above. However, since this treatment is made after mounting the driver IC, the driver IC portion must be masked to prevent the driver IC from being damaged by the etching treatment. Since the electric wiring, such as the terminal, is formed on the extended portion 4 as described above, the extended portion 4 should be masked and protected, too. Therefore, the extended portion 4 is preferably masked and protected as a whole even after mounting of the driver IC as shown in FIG. 3B. When the driver IC and the electric wiring are crowded in certain regions on the extended portion 4, the masks 7a and 7b may be formed only on the region of the driver IC and the electric wiring as shown in FIG. 3C with the other portions left unmasked. When scratches and cracks develop on the extended portion 4, they may result in cracking of the glass substrate. Therefore, these scratches and cracks are preferably etched away. Because the regions of the driver IC and the electric wiring cannot be etched, it is effective to mask and protect only such regions and to similarly carry out the etching treatment for other regions even on the extended portion 4.

Modified Example

Figure 3:
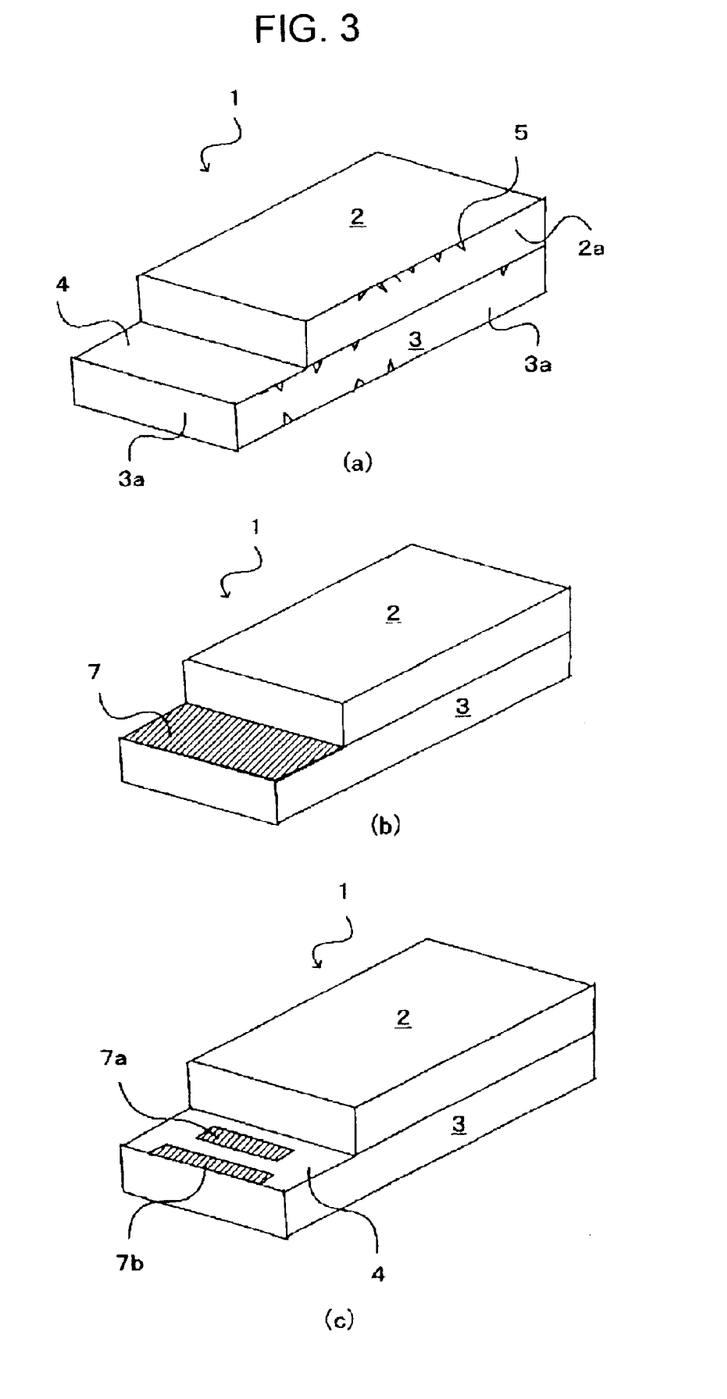
FIGS. 3a–3c schematically show a structure of a liquid crystal panel to which an etching treatment of the invention is applied.
Figure 4:
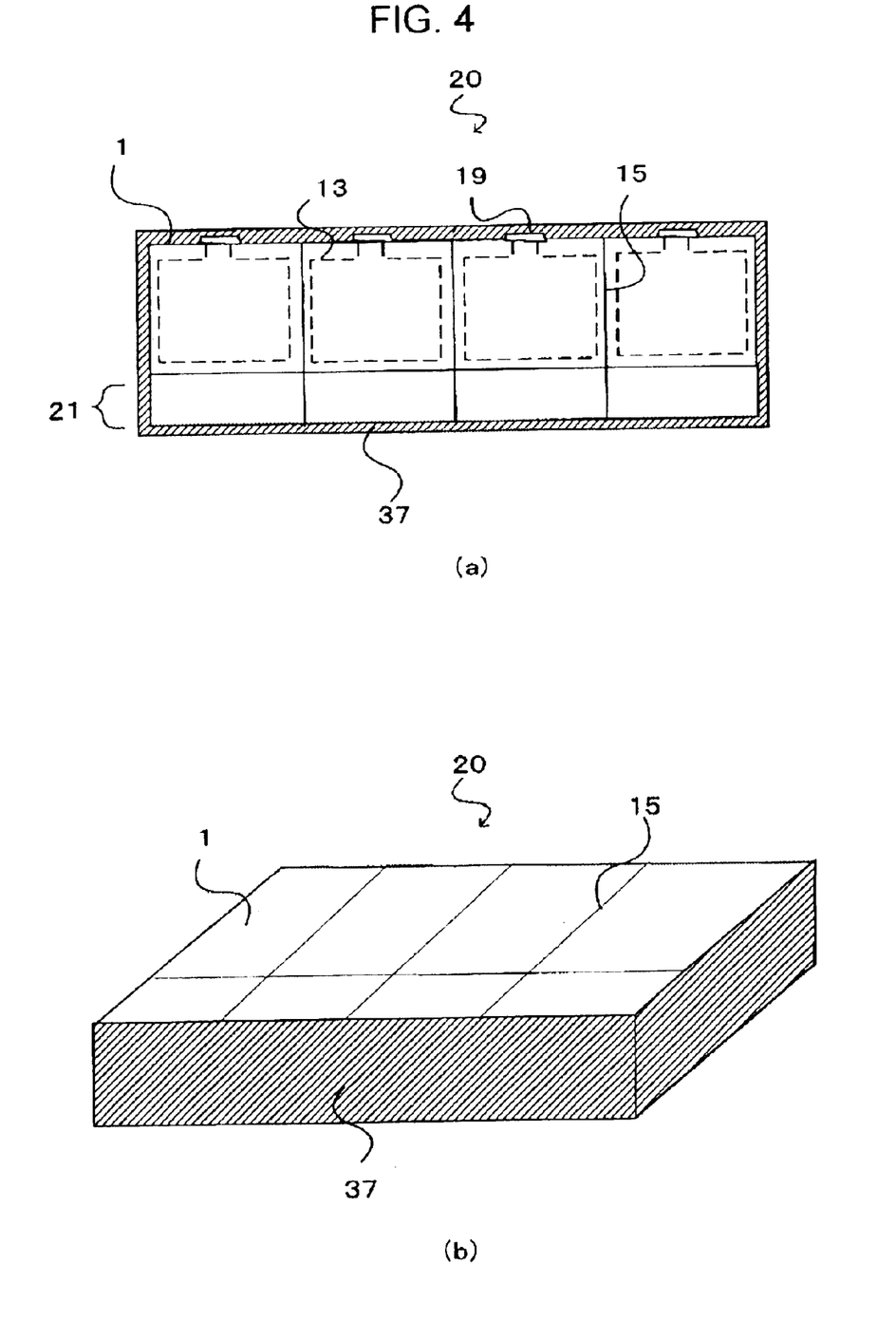
FIGS. 4a and 4b show a modified example of the etching treatment carried out in the state of the rectangular panel.
Figure 5:
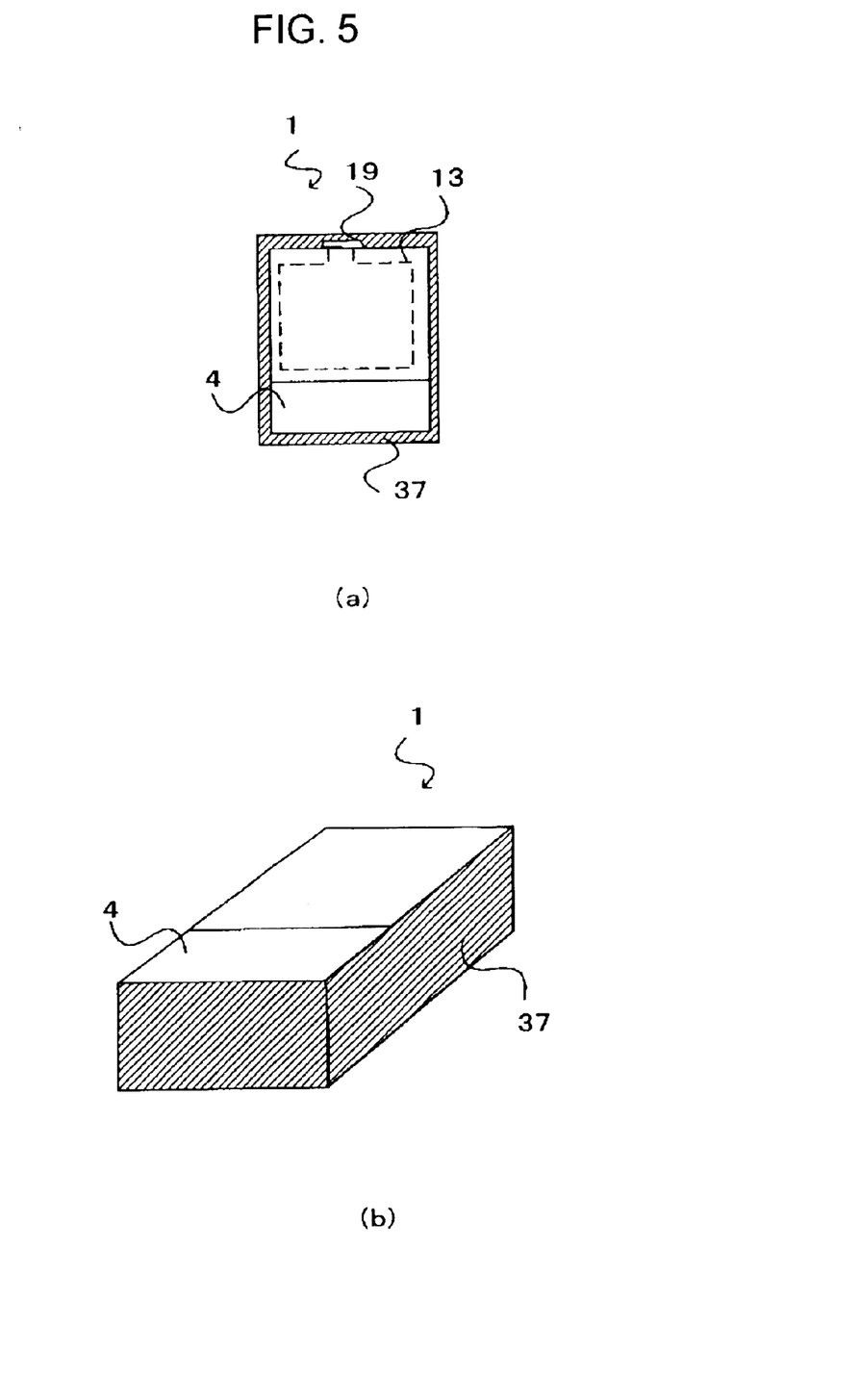
FIGS. 5a and 5b show a modified example of the etching treatment carried out in the state of a discrete liquid crystal panel.

Next, an explanation will be given of a modified example of the etching treatment carried out in the state of the rectangular panel and for the discrete liquid crystal panel (hereinafter called "etching treatment E"). In the etching treatment B in the state of the rectangular panel shown in FIG. 2 and in the etching treatment C in the state of the discrete liquid crystal panel 1 shown in FIG. 3, the etching treatment is carried out after the extended portions 21 and 4 are formed. Instead, it is possible to carry out the etching treatment of the rectangular panel 20 and the discrete liquid crystal panel 1 before the large sheet panel substrate 11 is cut along the cutting line 18, that is, before the step of exposing the extended regions 21 and 4 is conducted. FIGS. 4 and 5 show these examples. FIGS. 4A and 4B show the state where all of the side surfaces of the rectangular panel 20 are sealed with the sealant 37. FIGS. 5A and 5B show the state where all of the side surfaces of the discrete liquid crystal panel 1 are sealed with the sealant 37. In either case, since the large sheet panel substrate 11 is not removed (cut) in the region corresponding to the extended portion 21, 4, the extended portion 21, 4 need not be masked. This etching treatment can remove scratches and cracks developed on the upper and lower side surfaces of the liquid crystal panel 1.

Etching Method

Next, the etching treatment will be explained in detail. A chemical solution of a hydrofluoric acid type can be used preferably as an etching solution. It is possible to use an etching solution of a hydrofluoric acid, fluorosulfuric acid solution, hydrofluorosilic acid, ammonium fluoride and hydrofluoric acid, for example. Aqueous solutions of these compounds can be used preferably. It is possible to use, for example, an mixed aqueous solution of hydrofluoric acid and nitric acid, a mixed aqueous solution of hydrofluoric acid and ammonium fluoride, a mixed aqueous solution of hydrofluoric acid, ammonium fluoride and nitric acid, a mixed aqueous solution of hydrofluoric acid and ammonium hydrogendifluoride, and a mixed aqueous solution of hydrofluoric acid, ammonium hydrogendifluoride and nitric acid. A strong alkaline chemical solution such as caustic soda (NaOH) or potassium hydroxide (KOH) can be employed though the etching rate is low.

An etching method of ordinary glass can be employed as the etching method. Though wet etching using the etching solution described above is suitable, dry etching by use of an etching gas can be also employed.

The glass substrate constituting the liquid crystal panel may be composed of various materials including soda lime glass, borosilicate glass, alkali-free glass.

The masking method for the etching treatment includes a method that uses a chemical-resistant material having resistance to the chemical solution used as the etching solution and a method that applies a positive resist or a negative resist. These methods can be basically applied to all the etching treatments A to E described above.

The chemical-resistant material is applied by methods such as coating of wax or oil, bonding of a tape of the chemical-resistant material, and covering of the to-be-masked portion by use of putty or a viscous material. The last method is particularly effective for the etching treatments A and E that are carried out in the state of the large sheet panel substrate.

The method of application of the resist includes a method that dips the portion to be masked into the resist or sprays the resist, and then conducts exposures and development to form the desired mask pattern. Alternatively, it is possible to apply the resist to the portion to be masked by use of a brush or a writing bush. In this case, equipment for applying the resist becomes more economical. Still alternatively, it is possible to employ a method that applies the resist by jetting a droplet material from a nozzle into a desired mask pattern (so-called "ink jet method").

The method that applies ink jet can apply the resist into a minute pattern. Therefore, this method is extremely effective, particularly when masking specific portions such as the position of the driver IC and electric wiring portion on the extended portion 4 for the etching treatment C, which is carried out after the driver IC is mounted.

On the other hand, the removing method of the mask so formed varies fundamentally depending on the method of forming of the mask. When the photo-resist is used, the resist may well be dissolved away by use of a predetermined chemical solution. When the wax and the oil coating are applied, the coating can be dissolved away by use of a chemical solution. In the case of the chemical-resistant tape or putty, they may be simply peeled away.

Figure 6:
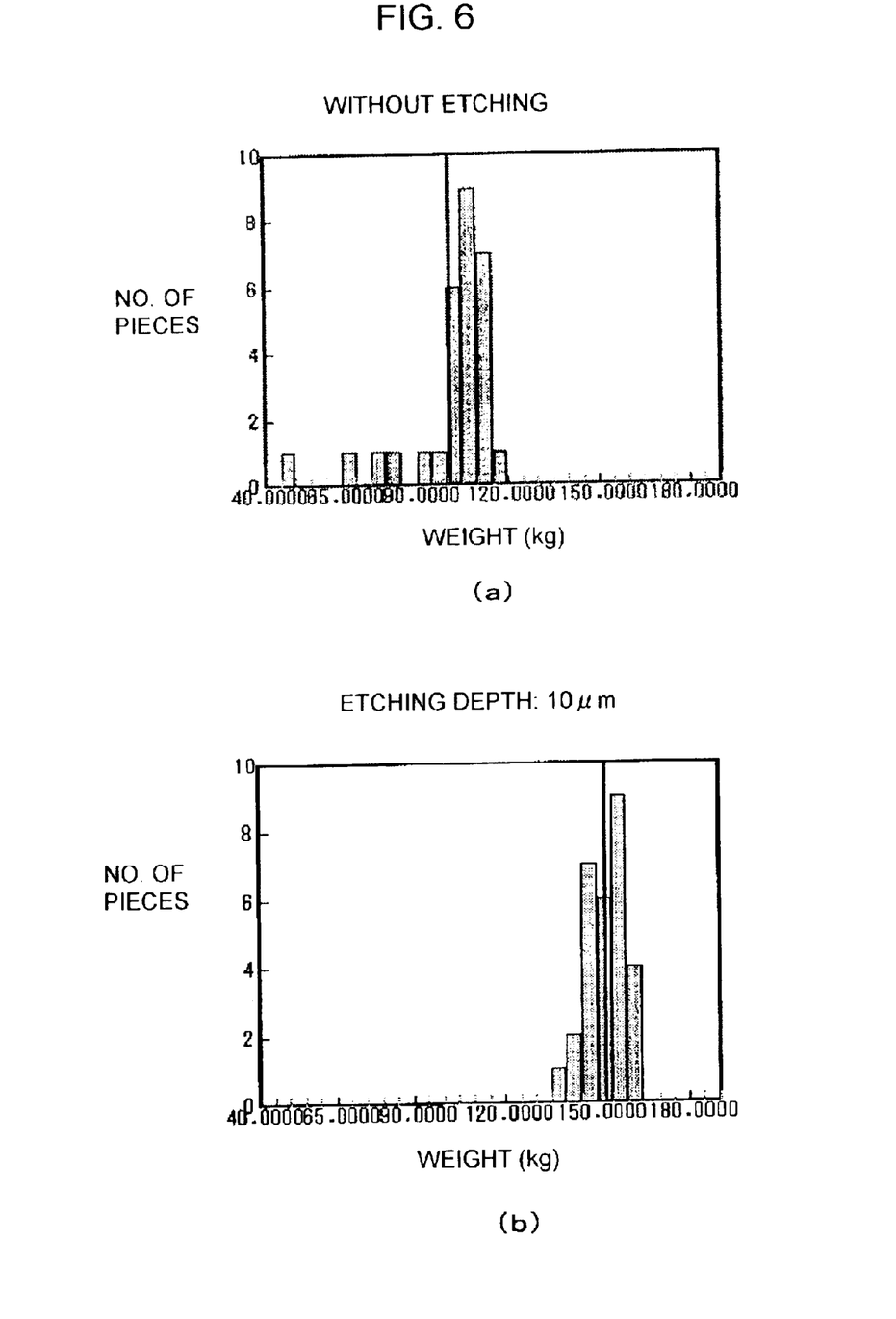
FIGS. 6a and 6b show graphs of mean strength of liquid crystal panels when the etching treatment of the invention is not carried out and when an etching depth is 10 $\mu$m.
Figure 7:
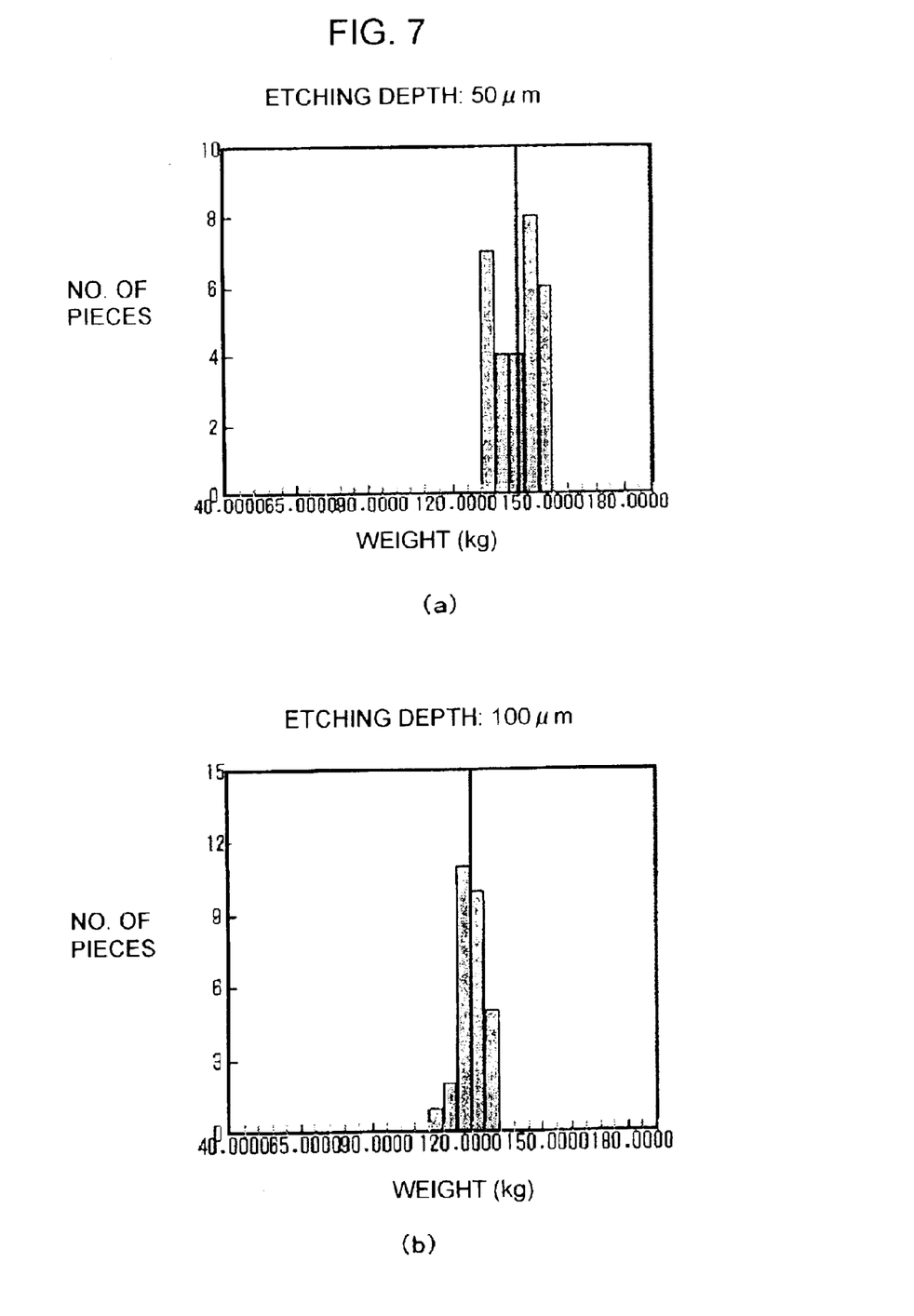
FIGS. 7a and 7b show graphs of mean strength of liquid crystal panels when an etching depth is 50 $\mu$m and 100 $\mu$m, respectively.

Next, an explanation will be given of the etching depth in the etching treatments described above. FIGS. 6 and 7 show the results of the strength test of a plurality of samples of the liquid crystal panels. The thickness of each of the upper and lower substrates of the liquid crystal panels used for the experiment is 0.5 mm. A predetermined weight is put on a sample 1) not subjected to the etching treatment, on a sample 2) having an etching depth of 10 $\mu$m, on a sample 3) having an etching depth of 50 $\mu$m and on a sample 4) having an etching depth of 100 $\mu$m. A weight application value when each sample is broken is recorded. FIG. 6A represents the case when the etching treatment is not made, FIG. 6B represents the result of at the etching depth of 10 $\mu$m, FIG. 7A represents the result at the etching depth of 50 $\mu$m and FIG. 7B represents the result at the etching depth of 100 $\mu$m. In each of the graphs, the weight application value at which the number of broken samples concentrates shows the mean strength of the liquid crystal panels to which the etching treatment of each level is applied.

It can be understood by comparing these graphs that the strength of the liquid crystal panel is higher when the etching treatment is carried out than when it is not carried out. It can be therefore understood that the etching treatment can remove scratches and cracks on the glass substrate and the cracking resistance of the glass substrate forming the liquid crystal panel can be improved. However, the mean strength is about 15 kg at the etching depth of 10 μm and at the etching depth of 50 μm and a difference hardly exists between them. On the other hand, the mean strength drops to about 13 kg, on the contrary, when the etching depth is 100 μm. Though the etching treatment in this case removes scratches and cracks of the glass substrate forming the liquid crystal panel in the same way as in the case of the etching depths of 10 μm and 50 μm, the absolute value of the strength of the glass substrate per se drops because the relative etching depth is greater with respect to the thickness of the glass substrate.

It can thus be understood that the etching treatment can remove scratches and cracks on the glass substrate forming the liquid crystal panel and can improve the crack strength of the glass substrate. It can also be understood that the etching depth of at least about 10 μm is necessary. On the other hand, it can be understood that even when the etching depth is increased beyond this level, no difference can be observed in the improvement of the strength of the glass substrate resulting from removal of scratch and crack. It can be further understood that when the etching depth becomes great relative to the original thickness of the glass substrate, the glass substrate is likely to undergo cracking as the absolute value of the strength of the glass substrate per se drops, though scratches and cracks can be removed.

Production Method of the Liquid Crystal Panel

Figure 8:
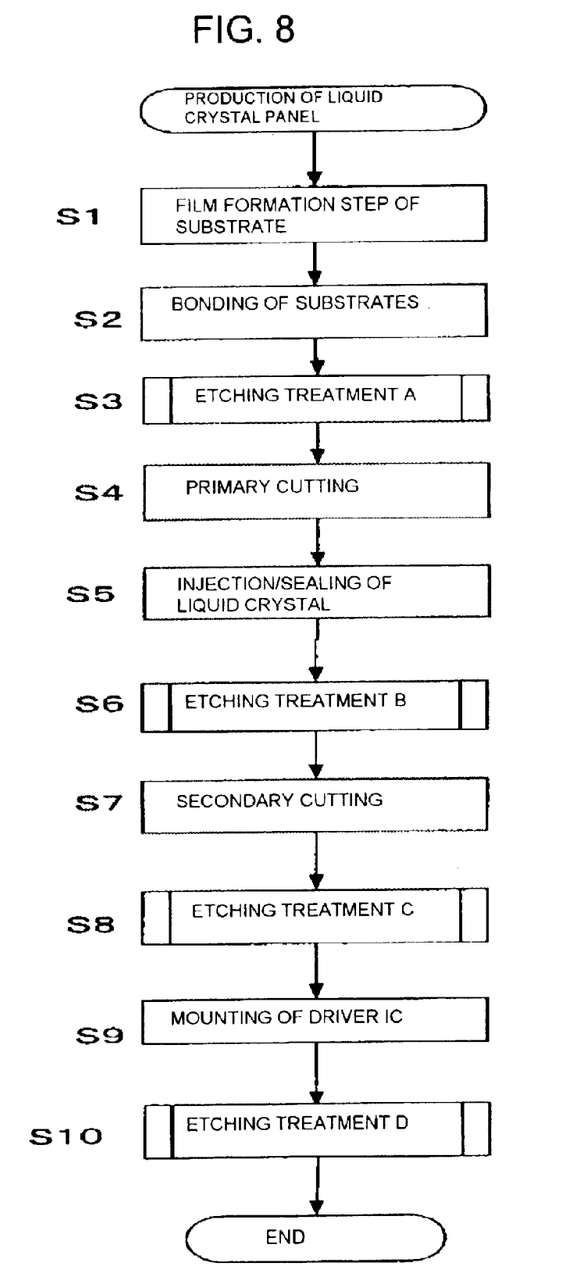
FIG. 8 is a flowchart of a production method of a liquid crystal panel to which the etching treatment of the invention is applied.

Next, an explanation will be given of a production method of a liquid crystal panel, in which the etching treatment according to the invention is applied. FIG. 8 is a flowchart showing the production method of the liquid crystal panel according to the invention.

First, a predetermined process such as the formation of transparent electrodes and orientation films are conducted for the large sheet glass substrates 11 and 12 shown in FIG. 1A (Step S1), and both substrates 11 and 12 are then bonded (Step S2). The large sheet panel substrate shown typically in FIG. 1A is thus obtained. The etching treatment A described above is carried out in this state (Step S3).

In this etching treatment A, the masking material 17 is applied to the side surfaces of the large sheet panel substrate 10 as shown in FIG. 1B and etching is carried out by use of the etching solution such as hydrofluoric acid. Washing is then conducted to wash away the etching solution, and the masking material 17 is removed. As a consequence, scratches and cracks developed on the portions other than the regions to which the masking material 17 is applied, that is, the upper and lower glass surfaces of the large sheet panel substrate 10, are removed.

Figure 2:
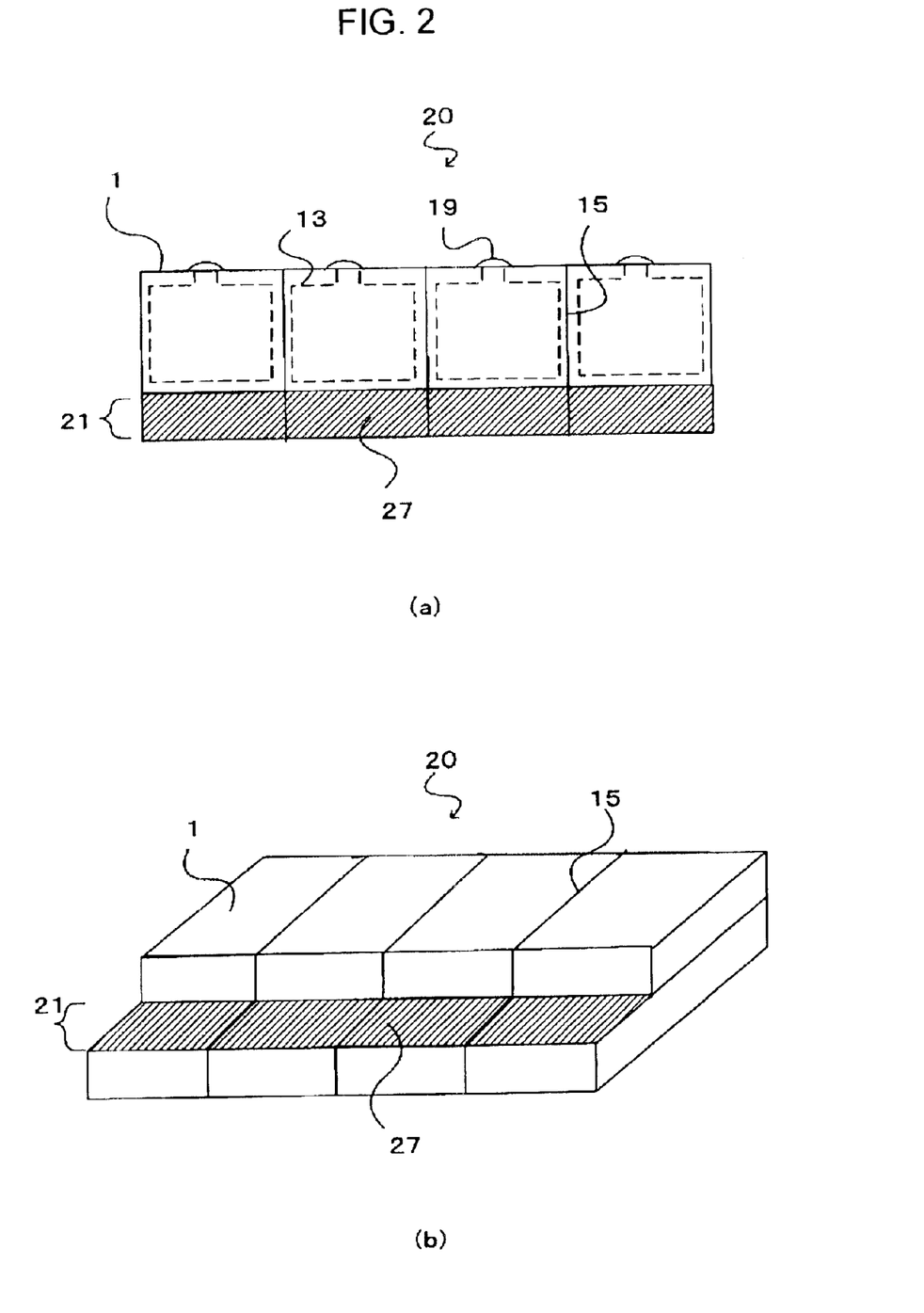
FIGS. 2a and 2b schematically show a structure of a rectangular panel to which the etching treatment of the invention is applied.

Next, primary cutting is conducted along the cutting lines 16 shown in FIG. 1A (Step S4). The liquid crystal is injected from the opening portion 14 of each liquid crystal panel exposed to the cut surface and the opening portion 14 is thereafter sealed (Step S5). The rectangular panels 20 each having the liquid crystal sealed therein can thus be obtained. Then, the etching treatment B is carried out for the rectangular panels 20 (Step S6). Alternatively, the masking material 27 may be applied to the extended portion 21 as shown in FIG. 2 (after the substrate 11 is cut along line 18) and the etching treatment may be carried out. The masking material is then removed.

The rectangular substrate is secondarily cut along the cutting lines 15 shown in FIG. 1A and the side of the glass substrate 11 is removed along the cutting lines 18 to acquire the discrete liquid crystal panels 1 shown in FIG. 3A (Step S7).

Next, the etching treatment C described above is carried out in the state of the discrete liquid crystal panel 1 (Step S8). In other words, as shown in FIG. 3A, the mask 7 is formed on the extended portion 4 of the liquid crystal panel 1 as shown in FIG. 3A and etching is carried out. After the etching solution is washed away, the mask is removed. Scratches and cracks developed on the side surfaces 2a and 3a of the upper and lower substrates 2 and 3 during the cutting of the large sheet panel substrate, shown in FIG. 3A, can thus be removed and the crack strength of the substrates can be improved.

The driver IC is mounted to a predetermined position on the extended portion 4 (Step S9) and the etching treatment D is carried out in this state (Step S10). In other words, only specific portions such as the mounting position of the driver IC and the positions of the electric wiring such as the terminals on the extended portion 4 are masked with the resist, and the etching treatment is carried out in the same way as each of the etching treatments described above. Since only the driver IC and the wiring position on the extended portion 4 must be masked in this etching treatment D, the mask should be formed in a minute pattern.

To this end, the application of the resist by the ink jet method is particularly effective among the mask formation methods described above.

In the liquid crystal panel 1 thus produced, scratches and cracks on the side surfaces 2a and 3a (the cut surfaces) are removed, and the crack resistance is improved. Therefore, crack and breakage of cellular telephone units, mobile terminals, etc, due to impact during their production process or during use by users can be reduced.

The example of the production process shown in FIG. 8 includes all the etching treatments A to D for explanation. However, these etching treatments need not always be carried out in practice and any one of them may be carried out. In such a case, which of them is to be carried out is determined in consideration of the characteristics of the liquid crystal panel itself or the characteristics of an apparatus to which the liquid crystal panel is mounted. The etching treatments A to E are selected in accordance with a shape of a casing of the apparatus for accommodating the liquid crystal panel and with the fitting position to the casing so that scratches and cracks of the portion that is likely to receive the impact in the apparatus can be effectively removed, and its treating method (masking method, etc) can be decided.

However, when the large sheet panel substrate is cut to produce the discrete liquid crystal panels as described above, the etching treatment C or D is preferably carried out to remove scratches and cracks that may develop on the side surfaces of the liquid crystal panel (side surfaces 2a and 3a and surface in FIG. 3A) due to cutting of the large sheet panel substrate.

Electronic Appliance

Figure 9:
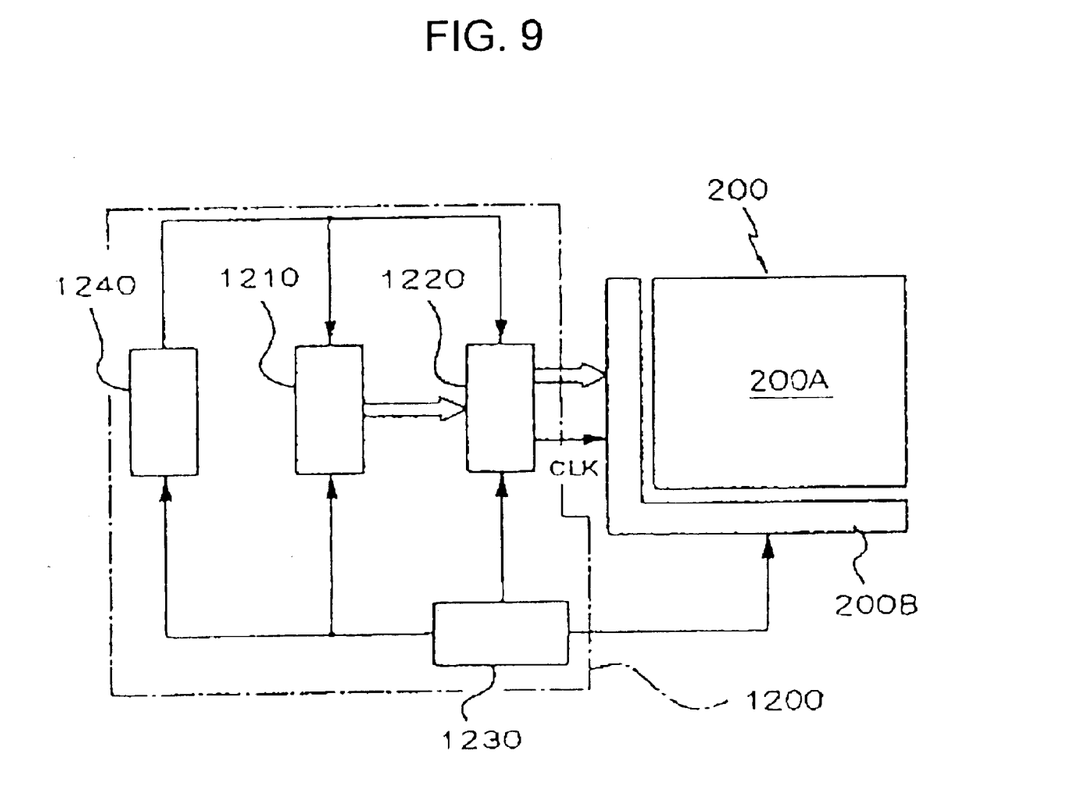
FIG. 9 is a schematic structural view showing a structural block of an electronic appliance in an embodiment of the invention.

Next, an embodiment, wherein the liquid crystal device including the liquid crystal display panel described above is accommodated as a display device of an electronic appliance, will be explained. FIG. 9 is a schematic diagram showing the overall construction of this embodiment. The electronic appliance shown in the drawing includes a liquid crystal display panel 200 analogous to the liquid crystal display panel 100 described above and control means 1200 for controlling the liquid crystal display panel 200. The drawing conceptually shows the liquid crystal display panel 200 while it is divided into a panel structure 200A and a driving circuit 200B formed of a semiconductor IC and the like. The control means 1200 includes a display information output source 1210, a display processing circuit 1220, a power source circuit 1230 and a timing generator 1240.

The display information output source 1210 includes a memory such as a ROM (Read Only Memory) and a RAM (Random Access Memory), a storage unit such as a magnetic recording disk and an optical recording disk and a sync circuit for synchronizing and outputting digital image signals. The display information output source 1210 is so constituted as to supply display information in the form of an image signal of a predetermined format to the display information processing circuit 1220 on the basis of various clock signals generated by the timing generator 1240.

The display information processing circuit 1220 includes various known circuits such as a serial-parallel conversion circuit, an amplification-inversion circuit, a rotation circuit, a gamma correction circuit, a clamp circuit, and so forth, processes input display information and supplies the image information with the clock signal "CLK" to the driving circuit 200B. The driving circuit 200B includes a scanning line driving circuit, a data line driving circuit and an inspection circuit. The power source circuit 1230 supplies a predetermined voltage to each of the constituent elements described above.

Figure 10:
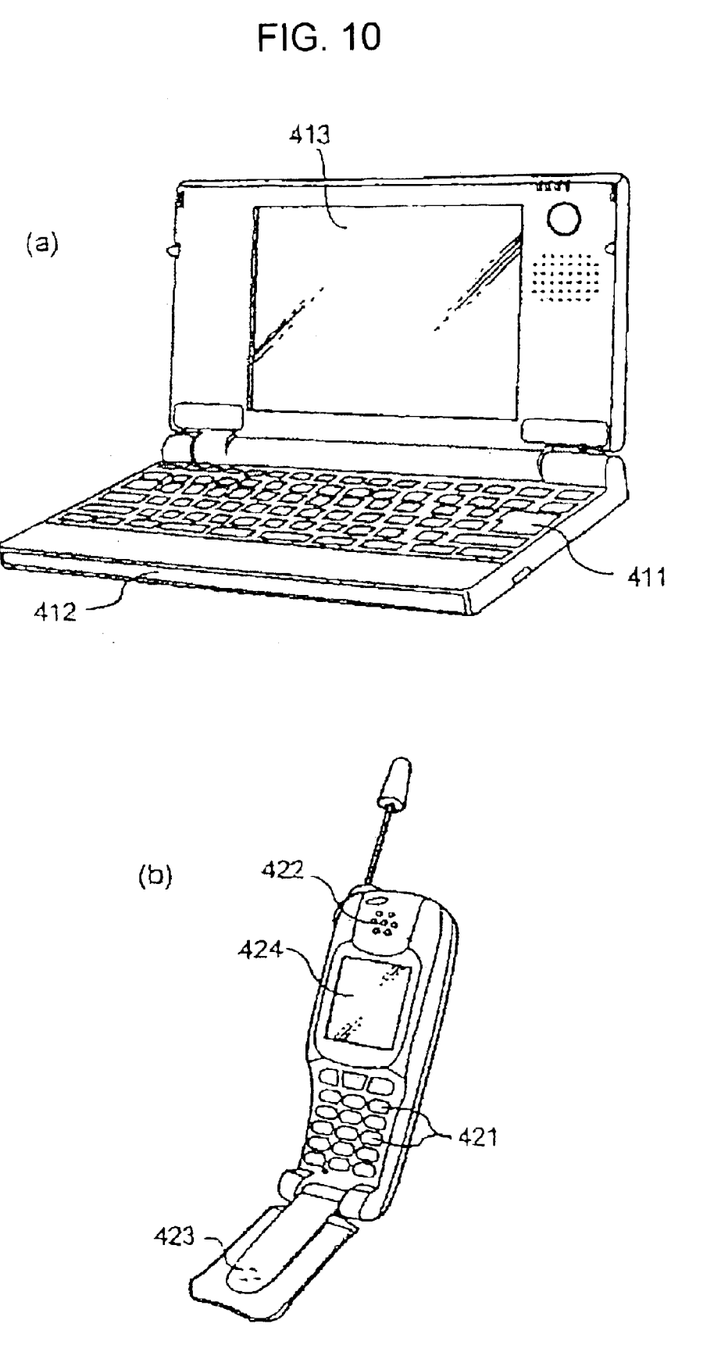
FIGS. 10a and 10b show examples of the electronic appliances, to which the liquid crystal display panel according to the embodiment of the invention, are applied.

Next, an explanation will be given with reference to FIG. 10 for particular examples of the electronic appliances to which the liquid crystal display panel according to the invention can be applied.

First, an explanation will be given of an application example of the liquid crystal display panel of the invention to a portable personal computer (so-called "notebook type personal computer"). FIG. 10A is a perspective view showing the construction of this personal computer. As shown in the drawing, the personal computer 41 includes a main body portion 412 equipped with a keyboard 411 and a display unit 413 to which the liquid crystal display panel of the invention is applied.

Next, an explanation will be given of an application example of the liquid crystal display panel of the invention to a display unit of the cellular telephone unit. FIG. 10B is a perspective view showing the construction of this cellular telephone unit.

As shown in the drawing, the cellular telephone unit 42 includes a display unit 424 to which the liquid crystal display panel of the invention is applied, with a earpiece 422 and a mouthpiece 423 besides a plurality of operation buttons 421.

Besides the personal computer shown in FIG. 10A and the cellular telephone unit shown in FIG. 10B, the electronic appliances to which the liquid crystal display panel according to the invention is applied includes a liquid crystal television set, a view finder type/monitor direction vision type video tape recorder, a car navigation apparatus, a pager, an electronic notebook, a calculator, a word processor, a work station, a television telephone, a POS terminal and a digital still camera.

Modified Embodiment

The liquid crystal display panel described above are not limited to only those examples described above but can of course be changed in various ways without departing from the scope of the invention.

As to the etching depth, the depth of etching the surface of the glass substrate by the etching treatment is at least about 10 μm as already described, and even when the etching depth is increased beyond this level, the etching depth does not contribute to the improvement of the crack strength so much. However, when a thicker glass substrate than a predetermined value is used from the beginning and the thickness of the glass substrate is adjusted simultaneously by the etching treatment of the invention, the etching depth must be increased. For example, when a 0.7 mm-thick glass substrate is used and a liquid crystal panel having an about 0.6 mm-thick glass substrate is produced eventually, the etching depth is set to about 100 μm in some cases. The etching depth in this case corresponds to the sum of the etching depth necessary for removing scratches and cracks and the etching depth necessary for adjusting the thickness of the glass substrate.

Each of the embodiments explained above represents a passive matrix type liquid crystal display panel. However, the electro-optical apparatus according to the invention similarly includes an active matrix type liquid crystal display panel (a liquid crystal display panel including TFT (thin film transistors) or TFD (thin film diodes) as switching devices, too). Besides the liquid crystal display panel, the invention can be likewise applied to a variety of electro-optical apparatuses such as an electro-luminescence apparatus, an organic electro-luminescence apparatus, a plasma display apparatus, an electrophoresis display apparatus, a field emission display (electric field emission display apparatus), and so forth.

The entire disclosure of Japanese Patent Application No. 2002-116691 filed Apr. 18, 2003 is incorporated by reference herein.

What is claimed is:

1. An electro-optical panel comprising:
   a first glass substrates bonded to a second glass substrate;
   wherein each of said glass substrates has an inboard surface facing the other substrate, a second surface not facing the other substrate, and side surfaces extending between said outboard surfaces and said inboard surfaces, a masking material covers said side surfaces, and said second surface of the first and second substrates is subjected to an etching treatment.

2. The electro-optical panel as defined in claim 1, wherein:
   said first glass substrate has an extended portion extending beyond an edge of said second glass substrate;
   a first region of said inboard surface of said extended portion has a semiconductor device and wires of conductors arranged thereon; and
   regions of said inboard surface of said extended portion other than said first region are subjected to said etching treatment.

3. The electro-optical panel as defined in claim 1, wherein said second surface comprises:
   an outboard surface on the opposite side of the substrates as the inboard surface; and
   side surfaces of the substrates extending between said outboard surface and to said inboard surface, and
   wherein each of said glass substrates has a ridgeline at an intersection of said outboard surface and said side surfaces, and said ridgeline is subjected to an etching treatment.

4. The electro-optical panel as defined in claim 1, wherein said electro-optical panel comprises a portion of a cut large sheet panel substrate, and said second surface includes a cut surface of said electro-optical panel.

5. The electronic appliance having said electro-optical panel as defined in claim 1 at a display portion thereof.

* * * * *